(12) United States Patent
Chen et al.

(10) Patent No.: US 11,314,118 B2
(45) Date of Patent: Apr. 26, 2022

(54) DISPLAY DEVICE AND OPTICAL FILM

(71) Applicant: AU OPTRONICS CORPORATION, Hsin-Chu (TW)

(72) Inventors: Yu-Hung Chen, Hsin-Chu (TW); Zong-Huei Tsai, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 178 days.

(21) Appl. No.: 16/408,886

(22) Filed: May 10, 2019

(65) Prior Publication Data
US 2019/0346714 A1 Nov. 14, 2019

(30) Foreign Application Priority Data
May 11, 2018 (TW) .................................. 107116358

(51) Int. Cl.
*G02B 27/00* (2006.01)
*G02F 1/1335* (2006.01)
*G02B 1/11* (2015.01)

(52) U.S. Cl.
CPC .......... *G02F 1/133502* (2013.01); *G02B 1/11* (2013.01); *G02B 27/0018* (2013.01); *G02F 1/133504* (2013.01)

(58) Field of Classification Search
CPC .. G02B 1/10; G02B 1/11; G02B 1/118; G02B 1/12; G02B 5/02; G02B 5/021; G02B 5/0221; G02B 5/0226; G02B 5/0231; G02B 27/0018; G02B 1/14; G02B 1/16; G02B 1/18; G02F 1/133502; G02F 1/133504

USPC ................................ 359/599, 601, 603, 609
See application file for complete search history.

(56) References Cited

U.S. PATENT DOCUMENTS

| 7,542,207 | B2 * | 6/2009 | Matsunaga | .......... G02B 5/0278 |
| | | | | 359/599 |
| 8,641,212 | B2 * | 2/2014 | Park | ......................... G02B 1/11 |
| | | | | 359/601 |
| 9,902,826 | B2 | 2/2018 | Sakakibara et al. | |
| 10,365,408 | B2 * | 7/2019 | Tung | ........................ G02B 1/11 |
| 2011/0080643 | A1 * | 4/2011 | Niinou | .................... G02B 1/118 |
| | | | | 359/599 |
| 2014/0247495 | A1 * | 9/2014 | Honda | ................. G02B 5/0221 |
| | | | | 359/599 |

(Continued)

FOREIGN PATENT DOCUMENTS

| CN | 106338783 | 1/2017 |
| CN | 106163804 | 12/2017 |

(Continued)

*Primary Examiner* — Thong Q Nguyen
(74) *Attorney, Agent, or Firm* — WPAT, PC

(57) ABSTRACT

A display device and an optical film are provided. The optical film is disposed on the display surface of the display device, and includes an anti-glare layer and an anti-reflection layer. The anti-glare layer has a first light-incident surface and a first light-exit surface. The anti-reflection layer is disposed on the first light-exit surface. The anti-reflection layer has a second light-incident surface and a second light-exit surface facing away from each other. The second light-incident surface faces the first light-exit surface of the anti-glare layer. The specular reflectance of the optical film is smaller than or equal to 0.14% for a light ray incident to the second light-exit surface at an incident angle ranging from 10 degrees to 30 degrees.

5 Claims, 7 Drawing Sheets

(56) References Cited

U.S. PATENT DOCUMENTS

2015/0226882 A1\* 8/2015 Sahara .................... G02B 1/18
 359/601
2016/0370505 A1\* 12/2016 Koo .................. H01L 27/14685
2019/0004213 A1   1/2019 Tung et al.

FOREIGN PATENT DOCUMENTS

| CN | 107462942 | 12/2017 |
| CN | 107728237 A | 2/2018 |
| EP | 3285095 A1 | 2/2018 |
| TW | 201736870 | 10/2017 |

\* cited by examiner

DISPLAY DEVICE AND OPTICAL FILM

FIELD OF THE INVENTION

The present invention relates to a display device and an optical film, and specifically to an anti-glare and anti-reflection optical film and the display device using the same.

BACKGROUND OF THE INVENTION

Some display devices of prior art reflect light or scatter light unevenly at the display surface, thus generating light of excessive level of luminance in the field of view, which causes glare. Glare results in visual discomfort and disability, lowering viewing experience and in some cases may even damage users' eyesight. Therefore, to provide a technical solution that solves the aforementioned problem has been an important issue in the industry.

SUMMARY OF THE INVENTION

One embodiment of the present invention provides optical film disposed on a display surface of a display device. The optical film comprises an anti-glare layer and an anti-reflection layer. The anti-glare layer has a first light-incident surface and a first light-exit surface. The anti-reflection layer is disposed on the first light-exit surface, and has a second light-incident surface and a second light-exit surface facing away from each other. The second light-incident surface faces the first light-exit surface of the anti-glare layer. A specular reflectance of the optical film is smaller than or equal to 0.14% for a light ray incident to the second light-exit surface at an incident angle ranging from 10 degrees to 30 degrees.

Another embodiment of the present invention provides a display device comprising a display module and an optical film. The display module has a display surface. The optical film includes an anti-glare layer and an anti-reflection layer. The anti-glare layer has a first light-incident surface and a first light-exit surface. The anti-reflection layer is disposed on the first light-exit surface, and has a second light-incident surface and a second light-exit surface facing away from each other. The second light-incident surface faces the first light-exit surface of the anti-glare layer. A specular reflectance of the optical film is smaller than or equal to 0.14% for a light ray incident to the second light-exit surface at an incident angle ranging from 10 degrees to 30 degrees.

Another embodiment of the present invention provides an optical film disposed on a display surface of a display device. The optical film comprises an anti-glare layer and an anti-reflection layer. The anti-glare layer has a first light-incident surface and a first light-exit surface. The anti-reflection layer is disposed on the first light-exit surface, and has a second light-incident surface and a second light-exit surface facing away from each other. The second light-incident surface faces the first light-exit surface of the anti-glare layer. A gamut keeping ratio of the optical film is equal to or greater than 40% for a light ray incident to the second light-exit surface at an incident angle ranging from 10 degrees to 30 degrees.

To further learn the features and technical content of the present invention, please refer to the following detailed descriptions and drawings related to the present invention. However, the provided drawings are used only for providing reference and descriptions, and are not intended to limit the present invention.

DETAILED DESCRIPTION OF THE PREFERRED EMBODIMENTS

Embodiments of the present invention are described below with reference to FIG. 1 to FIG. 10B. A person skilled in the art can understand the advantages and effects of the present invention from the description disclosed below. However, the content disclosed below is not intended to limit the protection scope of the present invention. The present invention can be implemented by a person skilled in the art based on different perspectives and applications without departing from the concept and spirit of the present invention. In addition, it should be stated in advance that the accompanying drawings of the present invention are merely used for illustration and are not drawn according to actual dimensions. Moreover, although terms, such as first, second, and third, may be used to describe various components, the component should not be limited by the terms. Said terms are used to distinguish different components.

Figure 1:
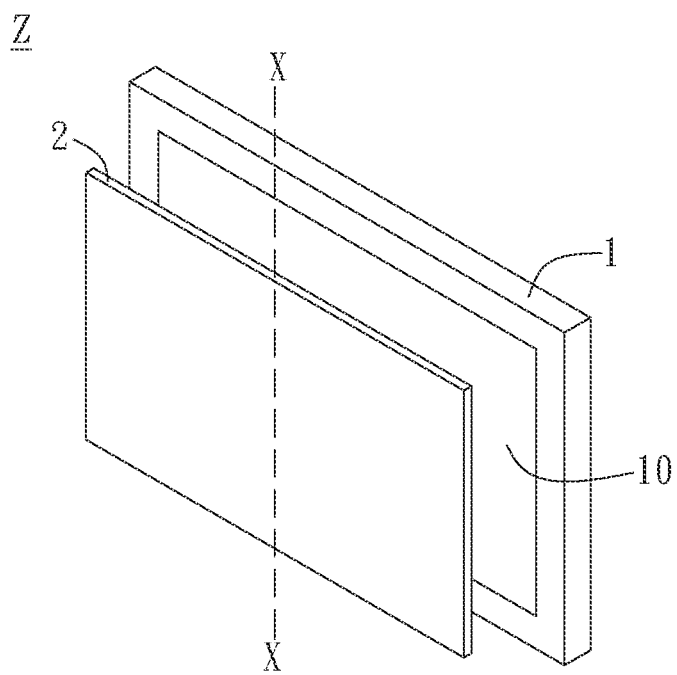
FIG. 1 is a schematic view illustrating a display device according to one embodiment of the present invention.

Reference is made to FIG. 1, which shows the display device Z provided by the present embodiment. The display device Z includes a display module 1 and an optical film 2. The display module 1 includes a display surface 10. Specifically, the display module 1 can be a computer screen, a billboard, an electronic paper display, a digital art display, etc., and the display surface 10 is where the display module 1 displays images for viewers. The present invention is not limited to the type of the display module 1. For instance, the display module 1 can be a liquid crystal display (LCD), an electro-phoretic display (EPD), an organic light-emitting display (OLED), a micro LED display, etc. As shown in FIG. 1, in the present embodiment, the size of the optical film 2 corresponds to that of the display surface 10. Specifically, the surface area of the optical film 2 substantially equals to the area of the display surface 10 such that the optical film 2 covers the display surface 10. However, the present invention is not limited thereto.

Figure 2:
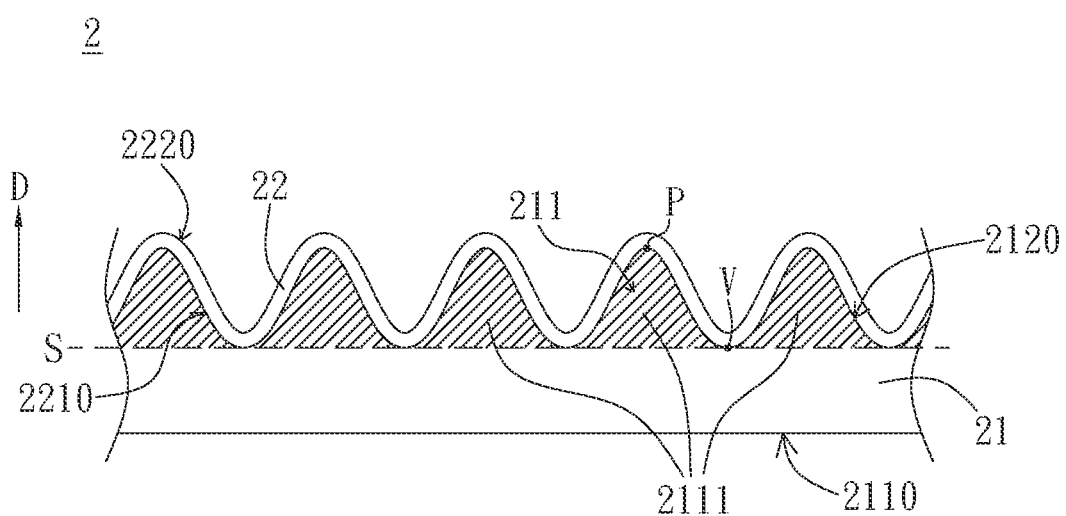
FIG. 2 is a partial sectional view illustrating an optical film according to one embodiment of the present invention.

Please refer to FIG. 2. FIG. 2 is a partial sectional view taken along line X-X of FIG. 1. As shown in the figure, the optical film 2 includes an anti-glare layer 21 and an anti-reflection layer 22. The anti-glare layer 21 has a first light-incident surface 2110 and a first light-exit surface 2120 facing away from each other. The anti-reflection layer 22 is disposed on the first light-exit surface 2120 and has a second light-incident surface 2210 and a second light-exit surface 2220. In the present embodiment, the anti-reflection layer 22 is a plating layer formed on the anti-glare layer 21, thereby having a shape that is complimentary to the shape of the anti-glare layer 21. However, the present invention is not limited thereto. The anti-reflection layer 22 can also be formed on the first light-exit surface 2120 of the anti-glare layer 21 by a vapor deposition process, a liquid deposition process or an imprinting process. In the present embodiment, the anti-reflection layer 22 is used for reducing the brightness of scattered light.

Figure 3:
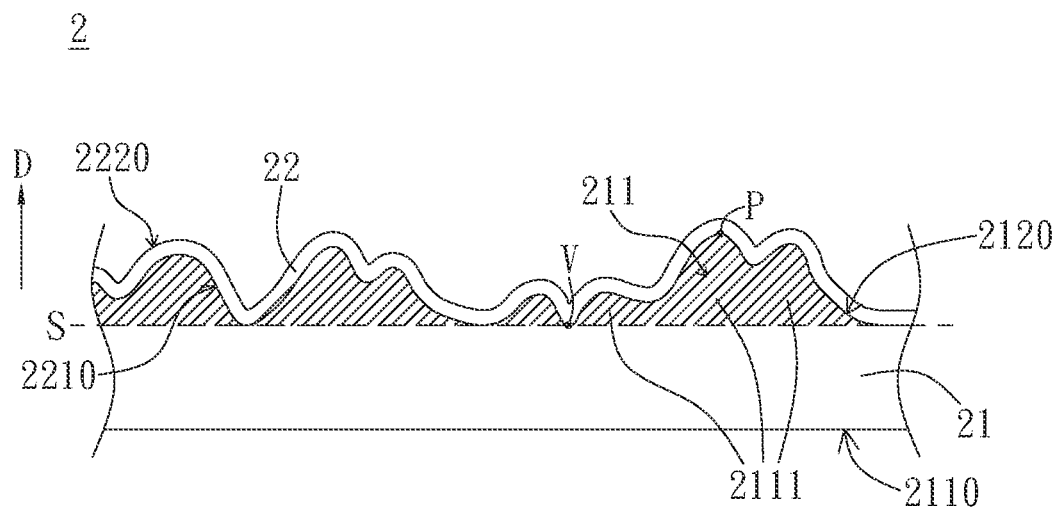
FIG. 3 is a partial sectional view illustrating the optical film according to a varied embodiment of the present invention.

Specifically, referring to FIG. 2 and FIG. 3, the anti-glare layer 21 includes a haze unit 211 formed on the first light-exit surface 2120. The haze unit 211 is shown as the areas marked with slashes in the figures. In the present embodiment, the haze unit 211 has a plurality of scattering structures 2111 protruding towards the second light-incident surface 2210. In other words the haze unit 211 of the anti-glare layer 21 is formed on the first light-exit surface 2120 such that the first light-exit surface 2120 has an uneven surface. The shape of each scattering structure 2111 and the way they are arranged are not limited in the present invention. For example, the scattering structures 2111 can have the same shape and are spaced apart by gaps of a fixed length, as shown in FIG. 2, or the scattering structures 2111 can have varied heights and varied widths, and are spaced apart by gaps of irregular lengths, as shown in FIG. 3. More specifically, the scattering structures 2111 can be distributed on the first light-exit surface 2120 in a regular or irregular pattern; the present invention is not limited thereto.

Referring to the sectional view shown in FIG. 3, the haze unit 211 can be formed of scattering structures 2111 of different heights and forms. Furthermore, when observing the first light-exit surface 2120 (or the second light-exit surface 2220) from above, the haze unit 211 can be formed of scattering structures 2111 arranged in an irregular dot pattern, in which the dots can be grouped. The scattering structures 2111 shown in FIG. 2 and FIG. 3 are continuous and connected to each other; however, the present invention is not limited thereto. In another embodiment, adjacent scattering structures 2111 can be spaced apart by intervals, in which the intervals can have a fixed length or different lengths.

It should be noted that, although the shape of each scattering structure 2111 is not limited in the present invention, sparkling or blur occurs in the display images if the height difference between the scattering structures 2111 exceeds a certain extent such that the level of unevenness of the first light-exit surface 2120 is too high. Therefore, the scattering structures 2111 of the present invention are relatively smooth and sloped gently than the haze structure of prior art, as shown in FIG. 2 and FIG. 3. More specifically, in a preferred embodiment, when a reference surface S is defined by a surface passing through the lowest point V of the scattering structures 2111 and parallel to the first light-incident surface 2110, the distance between the highest point P of the scattering structures 2111 and the reference surface S is not greater than 6 μm along the direction D, as shown in FIG. 2 and FIG. 3.

Through the scattering structures 2111, the anti-glare layer 21 of the present embodiment has a haze value no smaller than 40%. In other embodiments, with the adjustment on the shapes of the scattering structures 2111 and the density thereof, the anti-glare layer 21 has a haze value no smaller than 60%. In this way, the haze unit 211 serves to scatter ambient light so that ambient light incident to the surface of the display device Z can be scattered off the second light-exit surface 2220 evenly, thereby achieving enhanced anti-glare properties. Specifically, the aforementioned haze value refers to external haze value.

The haze structure of the optical film 2 can be exemplified in two ways, one of which is to include scattering particles in the optical film 2 so as to form an internal haze structure that has an internal haze value; another of which is to form an uneven structure on the external surface of the optical film 2 so as to achieve an external haze structure that has an external haze value. The external haze value can be calculated as follows. First, the overall haze value of the optical film is measured. Next, fill the uneven external surface of the optical film to form a uniform surface, and then measure the overall haze value of the optical film once again. The second measured haze value can be regarded as the internal haze value of the optical film, and the external haze value of the optical film 2 can be derived by subtracting the internal haze value from the first measured haze value.

Figure 4:
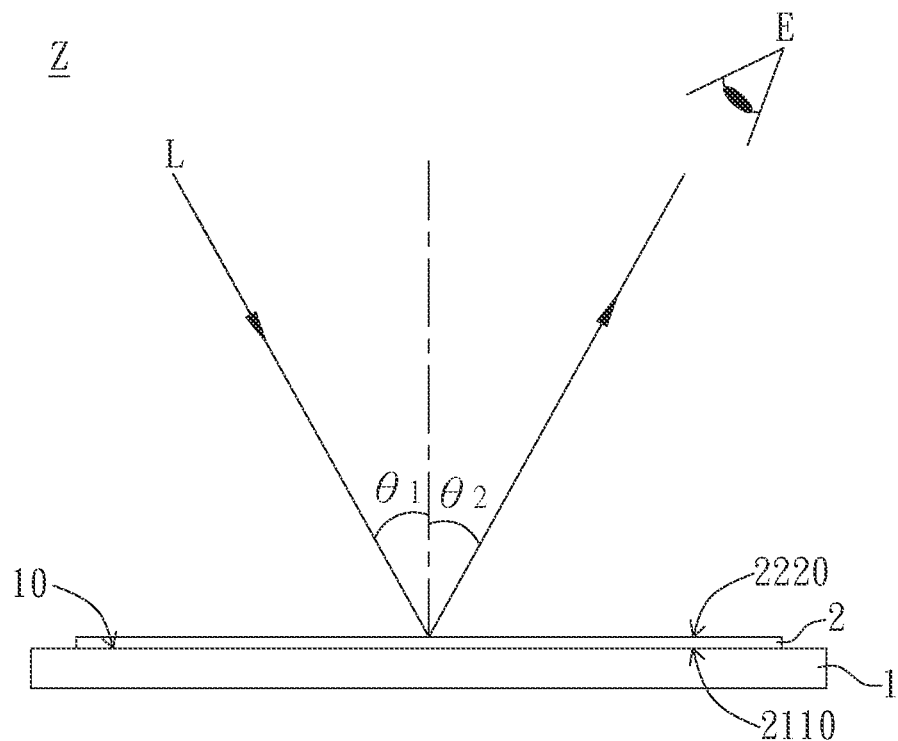
FIG. 4 is schematic view illustrating the display device according to the embodiment of the present invention from another viewing angle.

With reference to FIG. 4, when the optical film 2 of the present embodiment is disposed on the display module 1, the first light-incident surface 2110 of the anti-glare layer 21 faces the display surface 10 to receive light from the display images from the display module 1. The second light-exit surface 2220 of the anti-reflection layer 22 is used for outputting display images and receiving the ambient light ray L.

Referring to FIG. 4, in the present embodiment, the second light-exit surface 2220 of the optical film 2 has a specular reflectance smaller than or equal to 0.14% for a light ray L incident thereto at an incident angle $\theta_1$ ranging from 10 degrees to 30 degrees. Specifically, aforementioned specular reflectance refers to the percentage of the luminance of reflected light in the luminance of incident light when the reflection angle $\theta_2$ equals the incident angle $\theta_1$. The way of measuring the specular reflectance can be exemplified as follows. Optical films to be measured are mounted on display modules. A collimated light source 30 cm away from the display device Z is incident to the display device Z at an incident angle $\theta_1$. The collimated light source has an aperture with a size of 1 cm×1 cm. The intensity of reflected light is measured at a reflected angle $\theta_2$. In the present embodiment, the light source is substantially a collimated light source, but is not limited thereto.

By adjusting the haze unit 211 of the anti-glare layer 21 and the reflection rate of the anti-reflection layer 22, the specular reflectance of the optical film 2 can be reduced such that the anti-glare and anti-reflection properties of the optical film 2 can be enhanced. Referring to FIG. 4, the light reflected by specular reflection and traveling to the user's eye E causes glare. If the anti-glare structures (e.g. scattering structures) is distributed too densely in an area of the optical film 2, or the optical film 2 has a higher reflection rate for light of a certain incident angle, then light incident to said area or at said certain angle will cause glare. The embodiment of the present invention discloses the scattering structures 2111 and the anti-reflection layer 22 such that the optical film 2 has a specular reflectance smaller than or equal to 0.14% for light incident to the second light-exit surface 2220 at an incident angle from 10 degrees to 30 degrees, which means that when a user looks at the display device Z at a viewing angle of 10 degrees to 30 degrees, i.e. the reflection angle $\theta_2$, the amount of light reflected into the user's eye E will be smaller than or equal to 0.14% of the total incident light. Aforementioned "viewing angle" refers to the angle at which the user views with respect to the surface normal of the display device Z.

Figure 5:
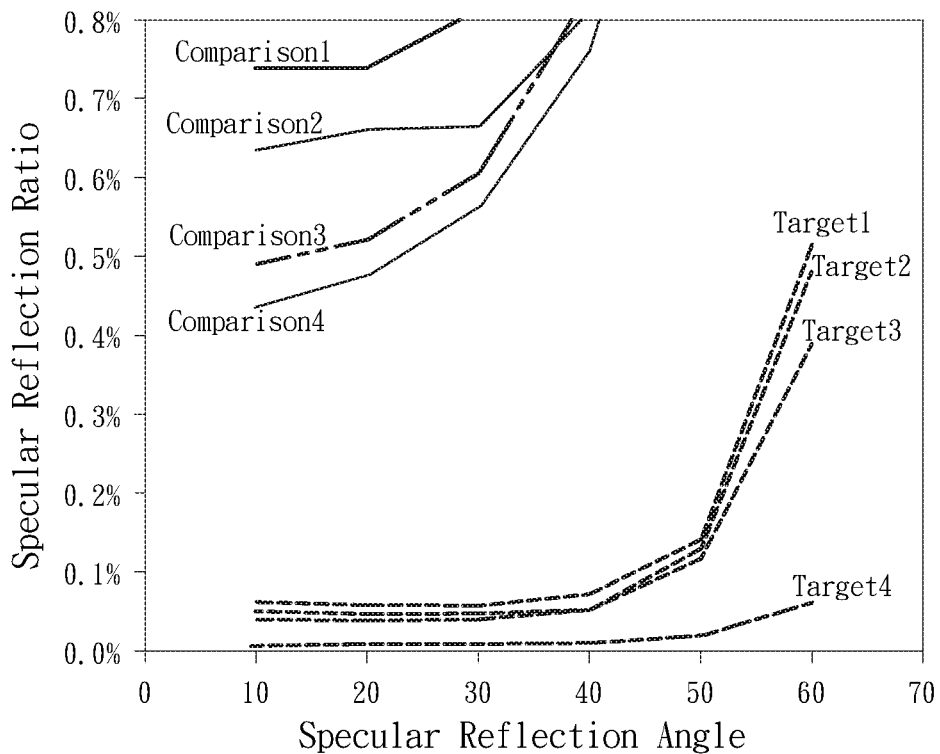
FIG. 5 shows the specular reflectance of the optical films according to various embodiments of the present invention within a range of specular reflection angles.

Please refer to FIG. 5. FIG. 5 is a line chart showing measured specular reflectances of display modules using the optical films according to various embodiments of the present invention (marked as Target1, Target2, Target3, and Target4) within a range of specular reflection angles, or, from the perspective of FIG. 4, the viewing angles of a user. In FIG. 5, measured specular reflectances of four other display modules each using an optical film of prior art (marked as Comparison1, Comparison2, Comparison3, and Comparison4) are also shown for comparison. It can be seen from the figure that the specular reflectances of the optical films (Target1, Target2, Target3, Target4) of the present invention are all under 0.14% for reflection angles from 10 degrees to 30 degrees.

Comparing the optical film in the embodiment having the greatest specular reflectance (Target1 of FIG. 5) to the optical film of prior art having the smallest specular reflectance (Comparison4 of FIG. 4), the specular reflectance of the optical film Target1 at 10 degrees to 30 degrees is around 0.07%, and that of the optical film Comparison4 ranges from 0.43% to 0.56%. Therefore, the optical films (Target1, Target2, Target3, Target4) of the present embodiment effectively reduce reflected light by at least 80%, thereby achieving enhanced anti-glare properties. Among the prior art optical films in FIG. 5, the optical film Comparison1 and the optical film Comparison2 are anti-reflection films, and the optical film Comparison3 and the optical film Comparison4 are anti-reflection and low-haze films. The optical films (Target1, Target2, Target3, Target4) shown in FIG. 5 are all optical films of the present embodiment as described above, wherein optical film Target1, optical film Target2, and optical film Target3 each have a haze value ranging from 35 to 45, and the haze value of optical film Target4 ranges from 65 to 75.

Furthermore, in a preferred embodiment such as Target4 of FIG. 5, the second light-exit surface 2220 exhibits a specular reflectance under 0.14% for an incident angle range between 10 degrees and 60 degrees. Therefore, for a display device wherein anti-glare effect is required for a large range of viewing angle, the optical film 2 of the preferred embodiment can satisfy the need of high anti-glare function.

Apart from adjusting the specular reflectance of the optical film 2, achieving a gloss value that is under a certain value by adjusting the structure can also enhance the anti-glare effect of the optical film 2. The gloss value is an optical property of a reflection surface that shows the specular reflection rate of the reflection surface.

Figure 6:
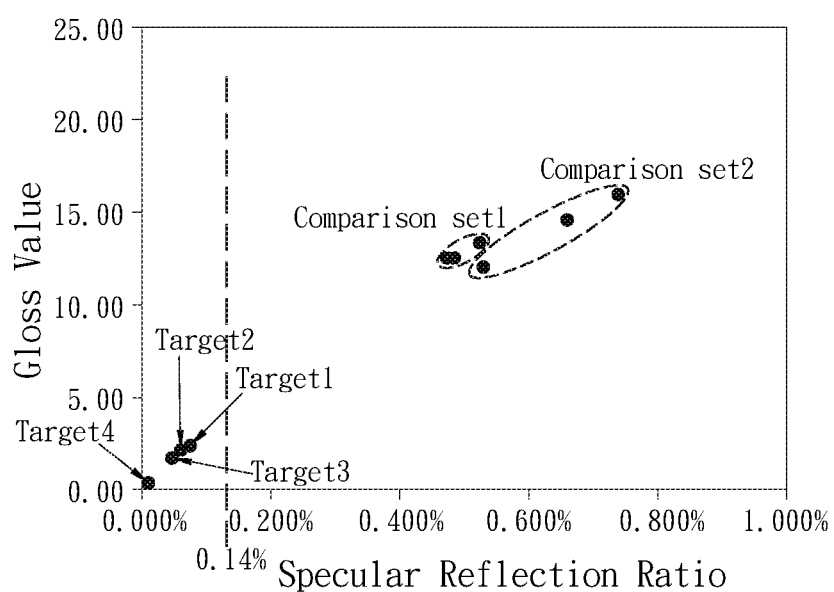
FIG. 6 shows a spot diagram illustrating the gloss value and the specular reflectance of the optical films according to various embodiments of the present invention at an incident angle of 20 degrees.

Referring to FIG. 4 and FIG. 6, FIG. 6 shows measured specular reflectances and measured gloss values of the optical films according to various embodiments of the present invention (Target1, Target2, Target3, Target4) for the light ray L incident to the second light-exit surface 2220 at 20 degrees. FIG. 6 also shows Comparison set1 and Comparison set2 illustrating measured specular reflectances and gloss values of prior art optical films for comparison. Comparison sea in FIG. 6 represents anti-reflection films, and Comparison set2 in FIG. 6 represents anti-reflection low-haze films. As shown in FIG. 6, the optical films of the present embodiment (Target1, Target2, Target3, Target4) have gloss values far lower than that of the optical films of prior art. Specifically, as shown in FIG. 6, the optical film 2 according to preferred embodiments of the present invention has a gloss value equal to or smaller than 4 for the light ray L incident to the second light-exit surface 2220 at 20 degrees.

Ambient contrast ratio (ACR) refers to the contrast ratio of a display surrounded by ambient light. In the present embodiment, through the technical solution of the anti-glare layer 21 and the anti-reflection layer 22, the problems of blur or sparkling caused by scattering structures in the prior art can be reduced, thereby enhancing the ACR of the display device Z and increasing the optical performance thereof.

Figure 7:
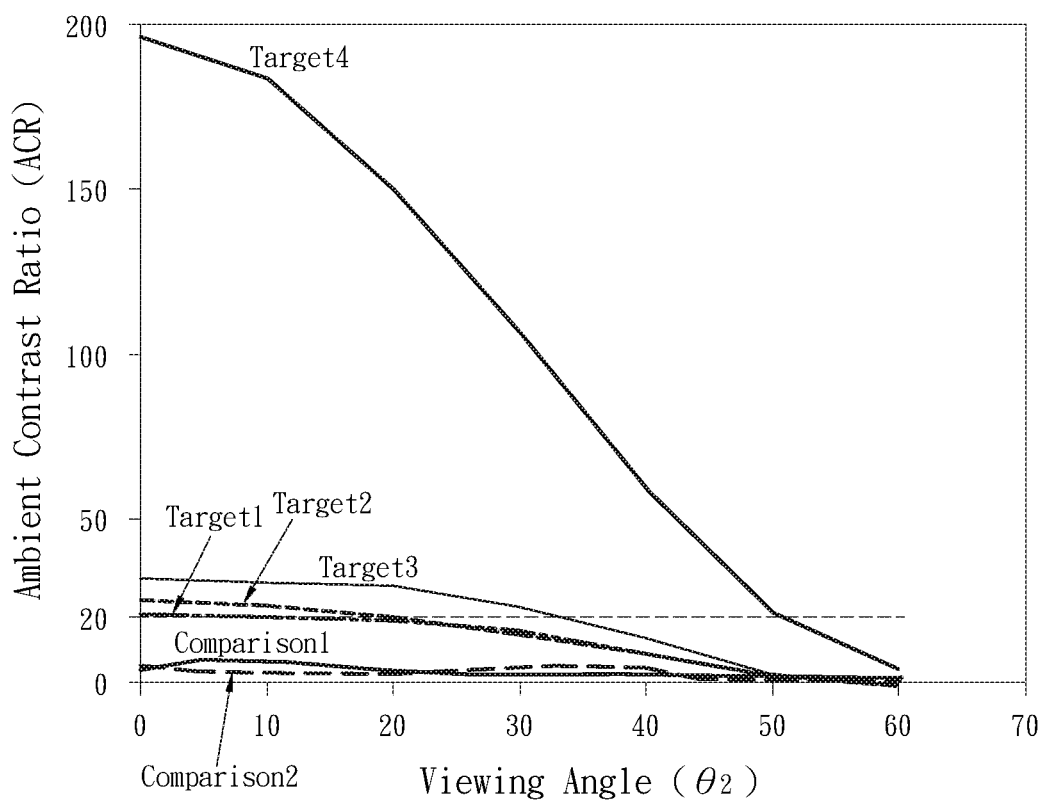
FIG. 7 shows the ambient contrast ratio (ACR) of the display devices according to various embodiments of the present invention within a range of viewing angles.

Referring to FIG. 7, FIG. 7 shows measured ACRs of the display device Z of the present embodiment at different viewing angles. Specifically, ACRs of the display modules 1 using optical films of different embodiments (Target1, Target2, Target3, Target4), as well as that of prior art optical films (Comparison1, Comparison2) are shown in FIG. 7. The optical film Comparison1 is an anti-reflection film, and the optical film Comparison2 is an anti-reflection and low-haze film. As shown in FIG. 7, the display device Z using optical films of the present embodiment exhibits an ACR higher than that of prior art. More specifically, embodiments of the present invention have ACRs greater than or equal to 20. Embodiments in FIG. 7 are measured as follows. The optical films are mounted on a display module, and measured in the same ambient light environment. For example, the light source is a blackbody radiation at 3200K color temperature and 7000 nits surface brightness, and the white screen of the display device Z has a brightness of 120 nits.

In general, the ACR of printed products is about 20. The optical film 2 of the present embodiment enables the display device Z to achieve an ACR greater than or equal to 20, which means the anti-glare effect provided by the optical film 2 of the present embodiment enhances the readability of general printed products.

Figure 8:
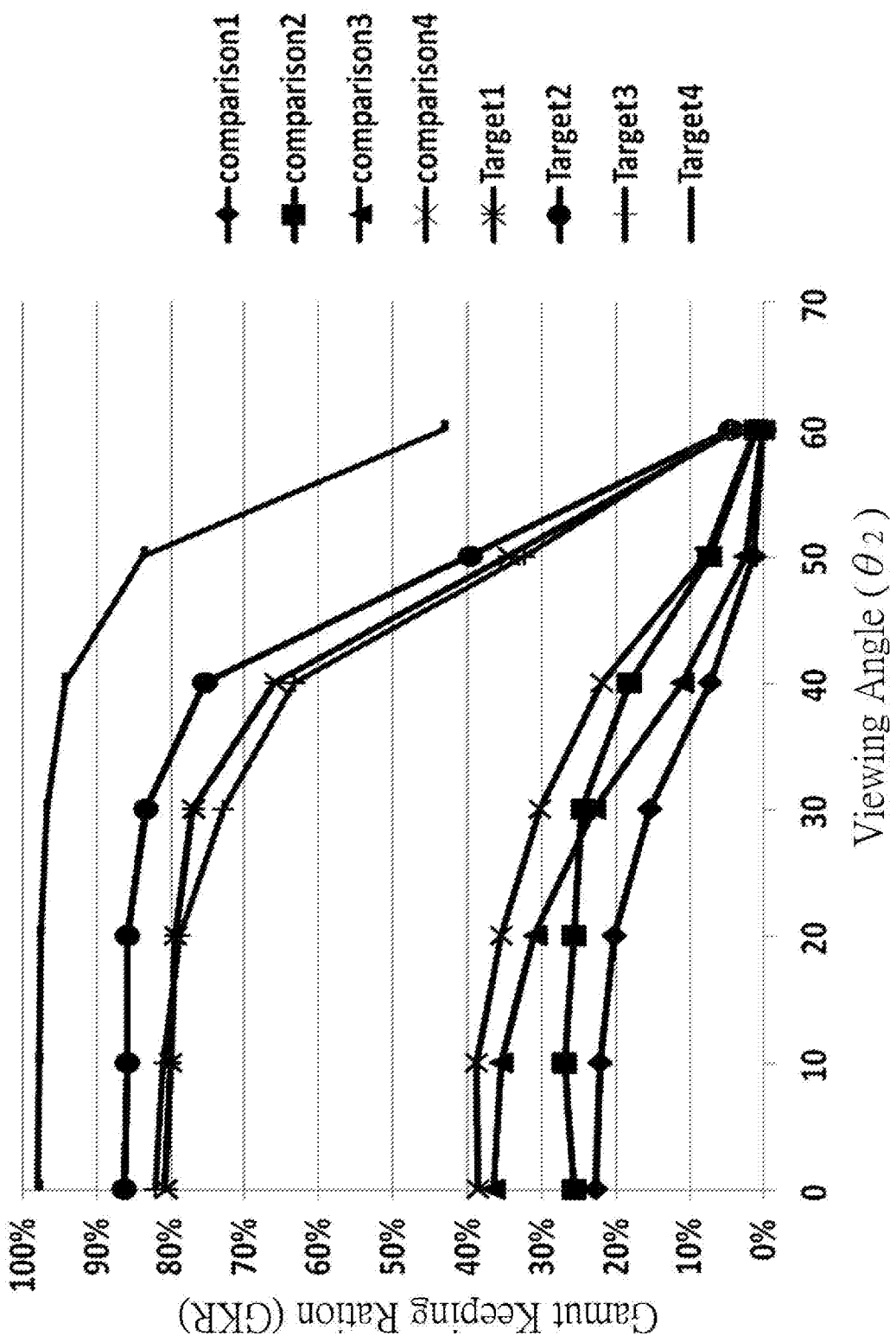
FIG. 8 shows a gamut keeping ratio (GKR) of the display devices according to various embodiments of the present invention within a range of viewing angles.
Figure 9A:
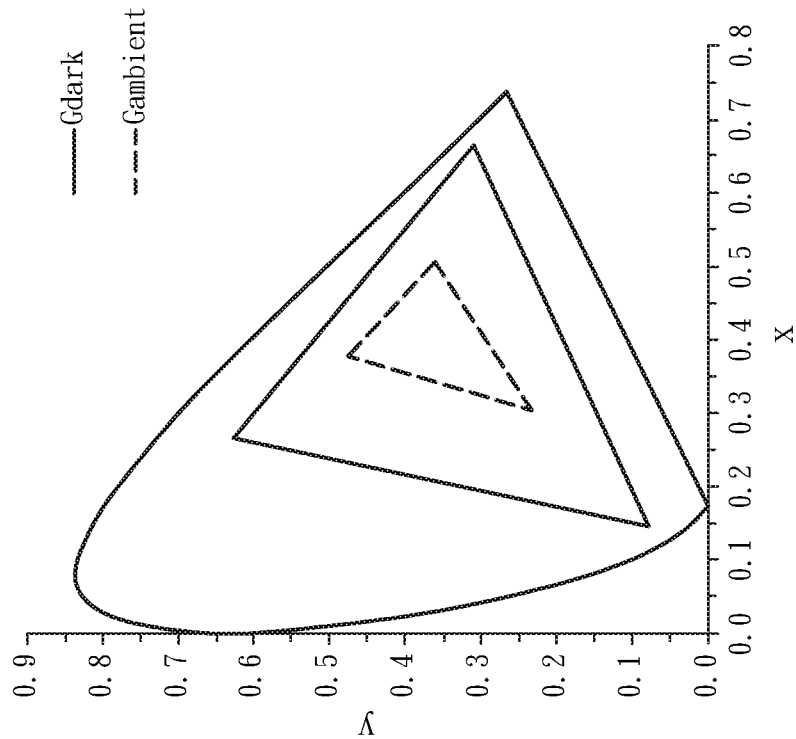
FIG. 9A and FIG. 9B illustrate the gamut keeping property of an optical film according to one embodiment of the present invention and that of a comparative example.
Figure 9B:
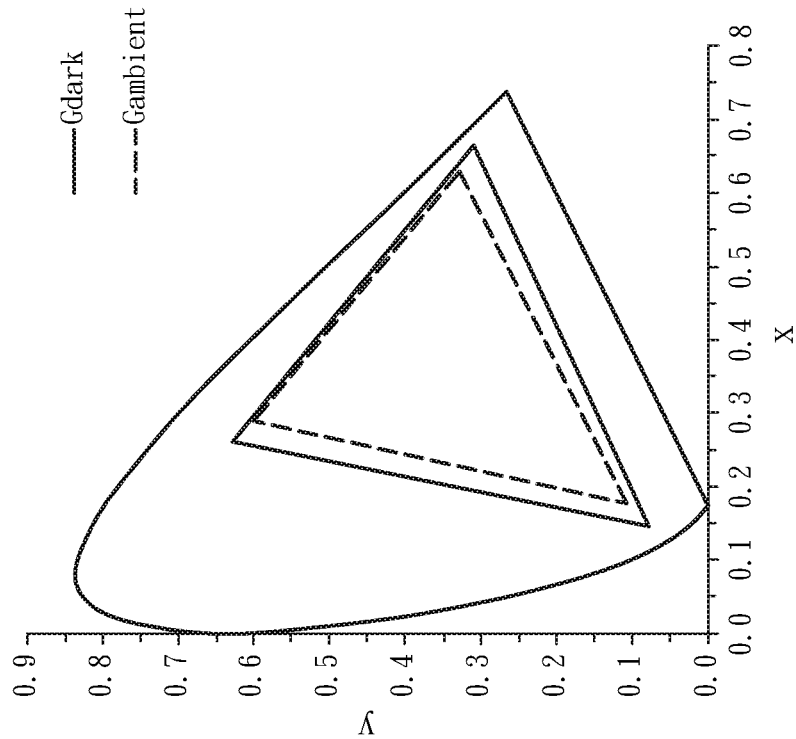

Moreover, with the technical solution of the anti-glare layer 21 and the anti-reflection layer 22, the optical film 2 and the display device Z using the optical film 2 according to the present embodiment exhibit enhanced gamut keeping property. Specifically, FIG. 8 shows a gamut keeping ratio (GKR) of the display devices Z using the optical films 2 according various embodiments of the present invention (Target1, Target2, Target3, Target4) and that of four other comparative examples of prior art (comparison1, comparison2, comparison3, comparison4). The aforementioned index GKR is defined as the ratio of the color gamut area measured in an ambient room to the color gamut area measured in a dark room. More specifically, referring to FIG. 9A, which shows a CIE color space diagram with the chromaticity range displayed by Target1 in a darkroom being enclosed by the triangle Gdark and the chromaticity range displayed by Target1 in an ambient room being enclosed by the dotted triangle Gambient, the chromaticity range in the CIE color space is defined as color gamut, and the index GKR indicates the percentage of color gamut area the display device is able display in an ambient room compared to that in a dark room. In other words, GKR shows the ability of a display to keep color information in an ambient environment.

As shown in FIG. 8, the optical films 2 according to various embodiments of the present invention (Target1, Target2, Target3, Target4) provide higher GKRs compared to the comparative examples (comparison1, comparison2, comparison3, comparison4). Specifically, Target1, Target2, Target3, and Target4 have GKRs greater than 40% for incident angles (or the viewing angle $\theta_2$, from the user's point of view) from 10 degrees to 30 degrees, and furthermore, greater than 40% for light incident at 10 degrees to 60 degrees, while the comparative examples (comparison1, comparison2, comparison3, comparison4) have GKRs under 40% for incident angles from 10 degrees to 60 degrees. In another perspective, the embodiments (Target1, Target2, Target3, Target4) shown in FIG. 8 have GKRs greater than 70% for incident angles (or viewing angle $\theta_2$) from 10 degrees to 30 degrees.

Figure 10B:
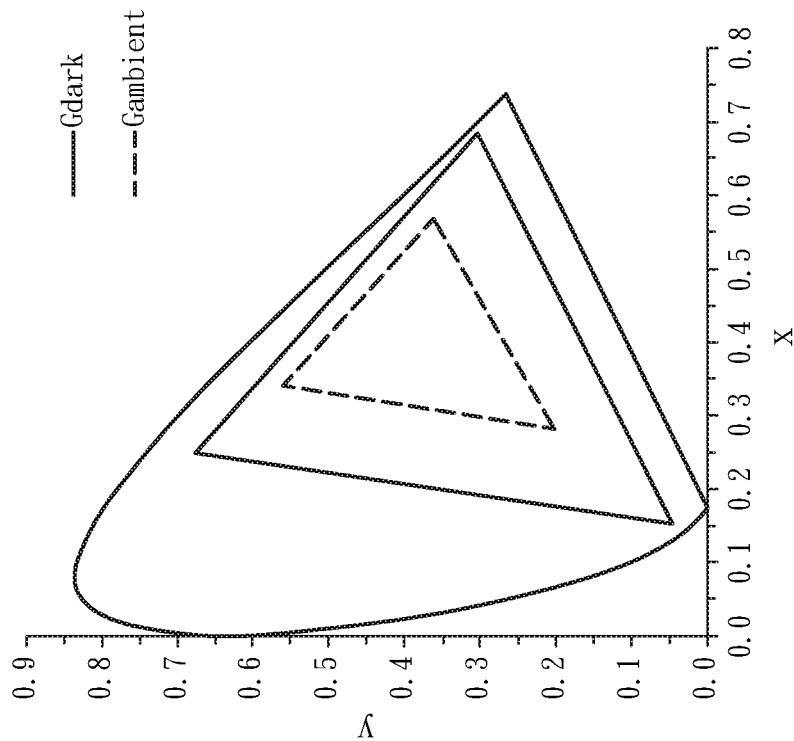
FIG. 10A and FIG. 10B illustrate the gamut keeping property of an optical film according to another embodiment of the present invention and that of a comparative example.
Figure 10A:
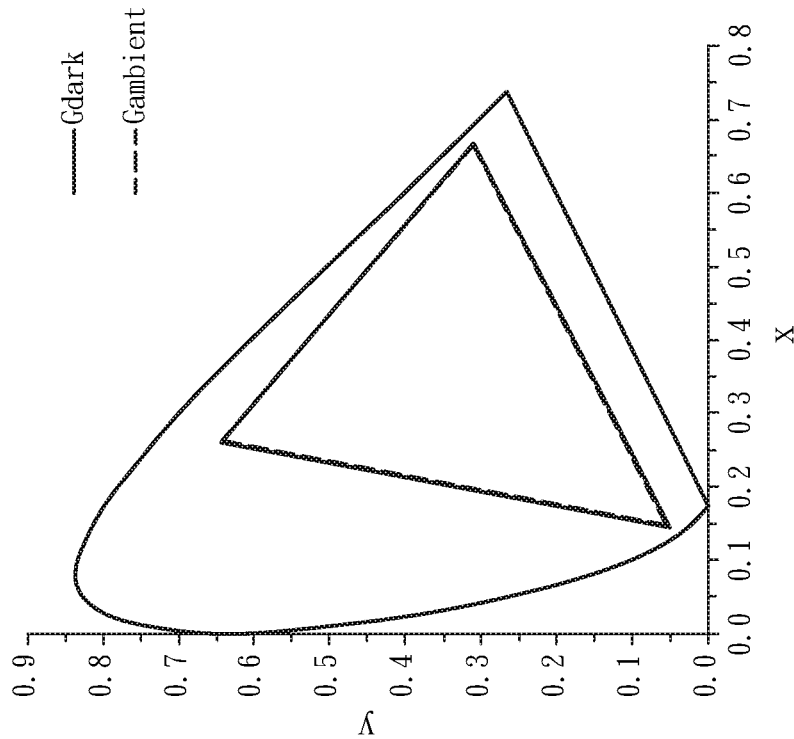

To better understand the GKR property of the optical film 2 provided by the present invention, please refer to FIG. 9A, FIG. 9B, FIG. 10A, and FIG. 10B, which respectively illustrate the gamut keeping property of Target1, comparison1, Target4, and comparison4 at a viewing angle of 30 degrees. Comparing FIG. 9A to FIG. 9B, Target1 displays a larger percentage of color gamut in the ambient environment than comparison1. With reference to FIG. 10A, Target4, which provides a GKR close to 100% at 30 degrees, displays a color gamut in the ambient environment enclosing an area nearly the same as the color gamut in the dark room. Comparing FIG. 10A to FIG. 10B, Target4 displays a greater percentage of color gamut in the ambient environment than comparison4, which is the optical film of prior art having the highest GKR among the comparative examples.

The GKRs shown in FIG. 8 to FIG. 10B according to various embodiments are measured in a dark room without obvious light sources where no more than 0.01 1× falls upon the display device Z, and in an ambient room where a light source that emits light to the display device Z is added to the aforementioned dark room, and the RGB chromaticities are measured at specular reflection angles in the aforementioned dark room and ambient room. The light source and the luminance of the display device Z can be exemplified as the previous embodiment where the ACRs are measured, i.e. a light source with an aperture of 1 cm×1 cm and 7000 nits surface brightness, and a display device set in white screen at 120 nits.

In summary, the optical film and the display device using the same provided by the present embodiment achieve enhanced anti-glare properties compared to that in the prior art by the technical solutions of "the anti-reflection layer being disposed on the anti-glare layer" and "the specular reflectance of the second light-exit surface is smaller than or equal to 0.14% for a light ray incident thereto at an incident angle ranging from 10 degrees to 30 degrees."

The present invention has been described with reference to the above embodiments, but the above embodiments are merely examples for implementing the present invention. It should be noted that the disclosed embodiments are not intended to limit the scope of the present invention. On the contrary, any modification and equivalent configuration within the spirit and scope of the appended claims shall fall within the scope of the present invention.

What is claimed is:

1. An optical film, disposed on a display surface of a display device, comprising:
    an anti-glare layer having a plurality of haze units with a haze value equal to or larger than 40%, a first light-incident surface and a first light-exit surface, wherein the first light-exit surface has a plurality of peak points and a plurality of lowest points, and the plurality of lowest points is arranged to form a reference surface parallel to the first light-incident surface; and
    an anti-reflection layer disposed on the first light-exit surface, having a second light-incident surface and a second light-exit surface facing away from each other, wherein the second light-incident surface is facing the first light-exit surface;
    wherein the plurality of peak points each has a height less or equal to 6 µm from the reference surface.

2. The optical film according to claim 1, wherein the haze value of the anti-glare layer is no smaller than 60%.

3. The optical film according to claim 1, wherein a gloss value of the optical film is smaller than or equal to 4 for the light ray incident to the second light-exit surface at an incident angle of 20 degrees.

4. A display device, comprising:
    a display module having a display surface; and
    an optical film, including:
        an anti-glare layer having a plurality of haze units with a haze value equal to or larger than 40%, a first light-incident surface and a first light-exit surface, the anti-glare layer being disposed on the display module with the first light-incident surface facing the display surface, wherein the first light-exit surface has a plurality of peak points and a plurality of lowest points, and the plurality of lowest points is arranged to form a reference surface parallel to the first light-incident surface; and
        an anti-reflection layer disposed on the first light-exit surface, having a second light-incident surface and a second light-exit surface facing away from each other, wherein the plurality of peak points each has a height less or equal to 6 µm from the reference surface.

5. The optical film according to claim 4, wherein a gloss value of the optical film is smaller than or equal to 4 for the light ray incident to the second light-exit surface at an incident angle of 20 degrees.

* * * * *